3,481,925
PROCESS FOR THE PREPARATION OF $\Delta^{5(10)}$-3β-HYDROXY-6-ACYLOXY STEROIDS Francisco Alvarez, Sunnyvale, Calif., assignor to Syntex Corporation, Panama, Panama, a corporation of Panama
No Drawing. Continuation-in-part of application Ser. No. 382,361, July 13, 1964. This application Dec. 12, 1966, Ser. No. 600,739
Claims priority, application Mexico, Oct. 29, 1963, 74,437
Int. Cl. C07c *167/00, 167/28, 173/00*
U.S. Cl. 260—239.55                          13 Claims

ABSTRACT OF THE DISCLOSURE

Process for the preparation of $\Delta^{5(10)}$-3β-hydroxy-6-acyloxy steroids by reacting a $\Delta^5$-3β,19-dihydroxy steroid with a lead tetraacylate in an inert organic solvent.

---

This is a continuation-in-part of my copending application Ser. No. 382,361 filed July 13, 1964, now U.S. Patent No. 3,318,923.

The present invention relates to a novel process for the preparation of cyclopentanophenanthrene derivatives and to novel cyclopentanophenanthrene derivatives.

More particularly, the present invention relates to a process for the preparation of $\Delta^{5(10)}$-3β-hydroxy-6-acyloxy steroids, valuable intermediates for the preparation of 19-nor compounds, which comprises reacting a $\Delta^5$-3β,19-dihydrxy steroid with a lead, tetraacylate in an inert organic solvent.

The $\Delta^{5(10)}$-3β-hydroxy-6-acyloxy steroids obtained by the process of the present invention are useful intermediates for the preparation of valuable $\Delta^{5(10)}$-19-nor and $\Delta^4$-19-nor-compounds as described in U.S. Patent No. 3,270,007 and for the preparation of ring-A aromatic compounds as described in application Ser. No. 382,361, filed July 13, 1964.

The process of the present invention can be illustrated as follows using for the sake of simplicity and clarity only the A-ring and B-ring of the steroid nucleus:

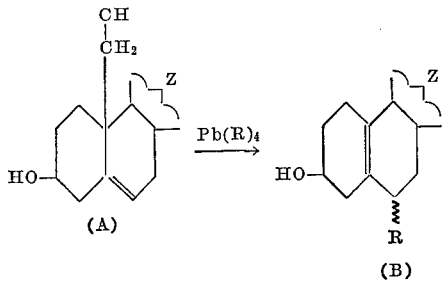

wherein R represents a hydrocarbon carboxylic acyloxy group derived from a lower saturated aliphatic, araliphatic, or aromatic hydrocarbon carboxylic acid such as acetoxy, propionoxy, phenylacetoxy, benzoyloxy, and the like, Z represents ring-C and ring-D of the steroid nucleus and the wavy line (ʃ) represents alpha and beta configuration.

In practicing the process of the present invention, a $\Delta^5$-3β,19-diol steroid (A), dissolved in an organic solvent which is inert to the reaction, e.g. a hydrocarbon solvent such as benzene, cyclohexane, hexane, and the like, a chlorinated hydrocarbon solvent such as carbon tetrachloride, chlorobenzene and the like, and mixtures thereof, is reacted with from about one to about two molar equivalents, per mole of steroid, of a lead tetraacylate, preferably lead tetraacetate or lead tetrabenzoate at a temperature of from about 50° C. to about 100° C. and preferably at from about 65° C. to about 75° C. or, in other words, at about reflux temperature for from about 10 minutes to about one hour or more to produce a mixture of the 6 alpha and 6 beta isomer of the corresponding $\Delta^{5(10)}$-3β,6-diol - 6 - acylate of Formula B containing predominantly the 6β-isomer. There may also be present in the reaction mixture a buffering amount of an alkali metal carbonate or alkaline earth metal carbonate such as sodium carbonate, calcium carbonate, or the like.

An illustrative but by no means exhaustive listing of $\Delta^5$-3β,19-dihydroxy steroid starting materials which can be employed in the process of the present invention includes $\Delta^5$-3β,19-dihydroxy steroids of the androstene, pregnene, and sapogenin series such as $\Delta^5$-androstene-3β,19-diol-17-one, 19-hydroxy-diosgenin, $\Delta^5$-androstene-3β,17β,19-triol, 17α-lower alkyl-$\Delta^5$-androstene-3β,17β,19-triol e.g. 17α-methyl, 17α-ethyl and the like, 17α-lower alkenyl-$\Delta^5$-androstene-3β,17β,19-triol, e.g. 17α-vinyl, 17α-propenyl, and the like, 17α-lower alkynyl-$\Delta^5$-androstene-3β,17β,19-triol e.g. 17α-ethynyl, 17α-propynyl, and the like, $\Delta^5$-pregnene-3β,19-diol-20-one, 16α-methyl-$\Delta^5$-pregnene-3β,19-diol-20-one, 16β-methyl - $\Delta^5$ - pregnene-3β,19-diol-20-one, $\Delta^5$-pregnene-3β,17α,19-triol-20-one, $\Delta^5$-pregnene-3β,17α,19-triol-20-one 17-acylate, 16α-methyl - $\Delta^5$-pregnene-3β,17α,19-triol-20-one 17-acylate, $\Delta^5$-pregnene 3β-17α,19,21-tetrol 17α,21-diacylate, 16α,17α-isopropylidene-dioxy-$\Delta^5$-pregnene-3β,19 - diol-20-one, 17α,20;20,21-bismethylenedioxy-$\Delta^5$-pregnene,3β,19 - diol, 17α,20;20,21-bismethylenedioxy-$\Delta^5$-pregnene-3β,19-diol-11-one, and the like. Suitable C-17 and C-21 acylates of the starting materials are those derived from carboxylic acids containing less than 12 carbon atoms such as acetate, t-butylacetate, trimethylacetate, phenoxyacetate, propionate, cyclopentylpropionate, butyrate, enanthate, benzoate, succinate and the like, preferably acetate.

A 17α-lower alkyl, lower alkenyl or lower alkynyl substituent can also be introduced in known manner after the above described reaction. Thus, for example, a mixture of the 6 alpha and 6 beta isomer of $\Delta^{5(10)}$-estrene-3β,6-diol-17one 6 acylate, e.g. the acetate, can be reacted with a lower alkyl, lower alkenyl or lower alkynyl magnesium halide, e.g.; methyl, vinyl or ethynyl magnesium bromide, in an inert organic solvent such as benzene or the like. A mixture of the 6 alpha and 6 beta isomer of $\Delta^{5(10)}$-estrene-3β,6-diol-17-one 6-acylate can also be reacted with acetylene or the like in the presence of potassium t-amylate and t-amyl alcohol to give the corresponding 17α-alkenyl-17β-hydroxy derivative. Where compounds having a 17α-lower alkenyl substituent are desired, the 17α-lower alkynyl substituent can be reduced to a 17α-lower alkenyl group, e.g., by dissolving the 17α-lower alkynyl steroid in an inert organic solvent such as pyridine, collidine, lutidine or the like, and hydrogenating at atmospheric pressure and room temperature with hydrogen gas, preferably in the presence of a hydrogenation catalyst such as pre-hydrogenated palladized calcium carbonate or platinum- or palladium-on-charcoal, until approximately one molar equivalent of hydrogen has been absorbed. Similarly, compounds having a 17α-lower alkyl substituent containing two or more carbon atoms can be prepared by hydrogenating the corresponding 17α-lower alkynyl steroid at atmospheric pressure and room temperature in dioxane, tetrahydrofuran, or the like and in the presence of a hydrogenation catalyst, e.g., one of those referred to hereinabove, until two molar equivalents of hydrogen have been absorbed.

The following examples are provided to illustrate the present invention but not as a limitation thereof.

EXAMPLE 1

To a solution of 100 grams of Δ⁵-androstene-3β,19-diol-17-one in 2000 ml. of anhydrous benzene there were added 1.1 equivalents of dry lead tetraacetate and 100 grams of calcium carbonate. The resulting reaction mixture was refluxed for 30 minutes. Following which it was filtered and the filter cake washed with benzene. The filtrate and the benzene washings were then combined and concentrated under vacuum to give a mixture of $\Delta^{5(10)}$-estrene-3β,6α-diol-17-one 6-acetate and $\Delta^{5(10)}$-estrene-3β,6β-diol-17-one 6-acetate.

By repeating this procedure in every detail but one, namely replacing Δ⁵-androstene-3β,19-diol-17-one as the steroid starting material with 17α-methyl-Δ⁵-androstene-3β,17β,19-triol, 17α-ethyl-Δ⁵-androstene - 3β,17β,19 - triol, 17α-vinyl-Δ⁵-androstene-3β,17β,19-triol, 17α - ethynyl-Δ⁵-androstene-3β,17β,19-triol, and Δ⁵-androstene-3β,17β,19-triol, respectively, a mixture of the corresponding $\Delta^{5(10)}$-3β,6α-diol 6-acetates and $\Delta^{5(10)}$-3β,6β-diol 6-acetates, namely 17α-methyl-$\Delta^{5(10)}$-estrene,3β,6α,17β-triol 6-acetate and 17α-methyl-$\Delta^{5(10)}$-estrene-3β,6β,17β-triol 6-acetate; 17α-ethyl-$\Delta^{5(10)}$-estrene-3β,6α,17β-triol 6-acetate and 17α-ethyl-$\Delta^{5(10)}$-estrene-3β,6β,17β-triol 6-acetate; 17α-vinyl-$\Delta^{5(10)}$-estrene-3β,6α,17β-triol 6-acetate and 17α-vinyl-$\Delta^{5(10)}$-estrene-3β,6β,17β-triol 6-acetate; 17α-ethynyl-$\Delta^{5(10)}$-estrene-3β,6α,17β-triol 6-acetate and 17α-ethynyl-$\Delta^{5(10)}$-estrene-3β,6β,17β-triol 6-acetate; and $\Delta^{5(10)}$-estrene-3β,6α,17β-triol 6-acetate and $\Delta^{5(10)}$-estrene-3β,6β,17β-triol 6-acetate respectively, was obtained.

EXAMPLE 2

Five hundred grams of Δ⁵-androstene-3β,19-diol-17-one suspended in 8 liters of benzene was azeotroped until about 250 ml. of solvent was removed. The mixture was cooled to 50° C. and then 750 g. of lead tetraacetate was added. The mixture was slowly distilled for about 40 minutes until about 2000 ml. of distillate, including azeotrope, was collected. The resulting mixture was cooled, washed with two liter portions, once with 2 liters of saturated sodium bicarbonate solution and then once with water. The aqueous washings were backwashed with benzene. The benzene solution and benzene backwashings were then combined, dried over sodium sulfate and concentrated under reduced pressure to a honey-like syrup of a mixture of the 6 alpha and 6 beta isomer of $\Delta^{5(10)}$-estrene-3β,6-diol-17-one 6-acetate in which the 6 beta isomer predominated.

By repeating the process of this example except for replacing Δ⁵-androstene-3β,19-diol-17-one as the starting material with Δ⁵-androstene-3β,17β,19-triol, 16α-methyl-Δ⁵-pregnene-3β,19-diol-20-one, 16β - methyl - Δ⁵-pregnene-3β,19-diol-20-one, 16α-methyl-Δ⁵ - pregnene - 3β,17α,19-triol-20-one 17-acetate, Δ⁵-pregnene-3β,17α,19,21-tetrol-20-one 17,21-diacetate, 16α,17α-isopropylidenedioxy - Δ⁵-pregnene-3β,19-diol-20-one, 17α,20;20,21-bismethylenedioxy-Δ⁵-pregnene-3β,19-diol, 17α,20;20,21-bismethylenedioxy-Δ⁵-pregnene-3β,19-diol-11 - one, Δ⁵ - pregnene - 3β,19-diol-20-one, Δ⁵-pregnene-3β,17α,19-triol-20-one 17-acetate and Δ⁵-pregnene-3β,17α,19-triol - 20 - one, respectively, a mixture of the 6 alpha and 6 beta isomer of the corresponding $\Delta^{5(10)}$-3β,6-diol 6-acetate, predominantly the 6 beta isomer, namely $\Delta^{5(10)}$-estrene-3β,6,17β-triol 6-acetate, 16α-methyl-19-nor-$\Delta^{5(10)}$-pregnene-3β,6-diol-20-one 6-acetate, 16β-methyl-19-nor-$\Delta^{5(10)}$-pregnene-3β,6-diol-20 - one 6-acetate, 16α-methyl-19-nor-$\Delta^{5(10)}$ - pregnene - 3β,6,17α-triol-20-one 6,17-diacetate, 19-nor-$\Delta^{5(10)}$-pregnene-3β,6-17α,21-tetrol-20-one 6,17,21-triacetate, 16α,17α-isopropylidenedioxy-19-nor-$\Delta^{5(10)}$-pregnene-3β,6-diol-20-one 6-acetate, 17,20;20,21-bismethylenedioxy - 19 - nor-$\Delta^{5(10)}$-pregnene-3β,6-diol 6-acetate, 17α,20;20,21-bismethylenedioxy-19-nor-$\Delta^{5(10)}$-pregnene-3β,6-diol-11-one 6-acetate, 19-nor-$\Delta^{5(10)}$-pregnene-3β,6-diol-20-one 6-acetate, 19-nor-$\Delta^{5(10)}$-pregnene-3β,6,17α-triol-20-one 6,17-diacetate and 19-nor-$\Delta^{5(10)}$-pregnene-3β,6,17α-triol-20-one 6-acetate, respectively, was obtained.

EXAMPLE 3

To a solution of 10 g. of Δ⁵-androstene-3β,19-diol-17-one in 150 cc. of thiophene-free benzene there were added 21.6 g. of lead tetraacetate (1.5 equivalents) and 20 g. of calcium carbonate and the reaction mixture was refluxed for 6 hours under stirring; the insoluble material was filtered off and the filtrate diluted with water. The organic layer was separated and washed to neutrality, dried over anhydrous sodium sulfate and evaporated to dryness under vacuo. Chromatography of the residue on 500 g. of washed alumina gave 6-acetoxy-$\Delta^{5(10)}$-19-nor-androsten-3β-ol-17-one (mixture of 6α and 6β-isomers).

What is claimed is:

1. A process for the preparation of a mixture of the 6 alpha and 6 beta isomer of a $\Delta^{5(10)}$-3β-hydroxy-6-acyloxy steroid which comprises reacting a Δ⁵-3β,19-dihydroxy steroid with at least one molar equivalent of lead tetraacylate, per mole of siad Δ⁵-3β,19-dihydroxy steroid, in an inert organic solvent.

2. A process according to claim 1 wherein said lead tetraacylate is lead tetraacetate.

3. A process according to claim 1 wherein said lead tetraacylate is lead tetraacetate and said solvent is selected from the group consisting of hydrocarbon solvents, chlorinated hydrocarbon solvents and mixtures thereof.

4. A process according to claim 1 wherein said Δ⁵-3β,19-dihydroxy steroid is selected from the group consisting of the androstene series and pregnene series.

5. A process according to claim 1 wherein said Δ⁵-3β,19-dihydroxy steroid is a member of the androstene series selected from the group consisting of Δ⁵-androstene-3β,19-diol-17-one, Δ⁵ - androstene - 3β,17β,19 - triol, 17α-lower alkyl-Δ⁵-androstene-3β,17β,19-triol, 17α-lower alkenyl-Δ⁵-androstene-3β,17β,19-triol and 17α-lower alkynyl-Δ⁵-androstene-3β,17β,19-triol.

6. A process according to claim 5 wherein said lead tetraacylate is lead tetraacetate and said solvent is selected from the group consisting of hydrocarbon solvents, chlorinated hydrocarbon solvents, and mixtures thereof.

7. A process according to claim 5 wherein said solvent is a hydrocarbon solvent selected from the group consisting of benzene, cyclohexane and hexane and said lead tetraacylate is lead tetraacetate.

8. A process according to claim 5 wherein said solvent is a chlorinated hydrocarbon solvent selected from the group consisting of chlorobenzene and carbon tetrachloride and said lead tetraacylate is lead tetraacetate.

9. A process according to claim 5 wherein said solvent is benzene, said lead tetraacylate is lead tetraacetate, and said reaction is conducted at about reflux temperature.

10. A process according to claim 1 wherein said Δ⁵-3β,19-dihydroxy steroid is a member of the pregnene series selected from the group consisting of Δ⁵-pregnene-3β,19-diol-20-one, Δ⁵-pregnene-3β,17α-19-triol-20-one, Δ⁵-pregnene-3β,17α,19-triol-20-one 17-acylate, 16α-methyl-Δ⁵-pregnene-3β,19-diol-20-one, 16β-methyl - Δ⁵ - pregnene-3β,19-diol-20-one, 16α-methyl - Δ⁵ - pregnene - 3β,17α,19-triol-20-one 17 - acylate, 16α,17α-isopropylidenedioxy-Δ⁵-pregnene-3β,19-diol-20-one, 17,20;20,21 - bismethylenedioxy-Δ⁵-pregnene-3β,19-diol and 17,20;20,21-bismethylenedioxy-Δ⁵-pregene-3β,19-diol-11-one.

11. A process according to claim 10 wherein said tetraacylate is lead tetraacetate, said solvent is selected from the group consisting of hydrocarbon solvents, chlorinated hydrocarbon solvents and mixtures thereof and said 17-acylate is the 17-acetate.

12. A process according to claim 10 wherein said lead tetraacylate is lead tetraacetate, said solvent is a hydrocarbon solvent selected from the group consisting of benzene, cyclohexane and hexane, and said 17-acylate is the 17-acetate.

13. A process according to claim 10 wherein said lead tetraacylate is lead tetraacetate, said solvent is benzene, said 17-acylate is the 17-acetate and said reaction is conducted at about reflux temperature.

References Cited
UNITED STATES PATENTS

| | | | |
|---|---|---|---|
| 3,150,155 | 9/1964 | Ladabaum | 260—397.4 |
| 3,178,419 | 4/1965 | Jeger et al. | 260—239.55 |
| 3,206,460 | 9/1965 | Bowers | 260—239.55 |

OTHER REFERENCES

Djerassi, Steroid Reactions, p. 134.

HENRY A. FRENCH, Primary Examiner

U.S. Cl. X.R.

260—397.4, 397.5, 397.47

UNITED STATES PATENT OFFICE
CERTIFICATE OF CORRECTION

Patent No. 3,481,925            Dated December 2, 1969

Inventor(s) Francisco Alvarez

It is certified that error appears in the above-identified patent and that said Letters Patent are hereby corrected as shown below:

Column 1, line 32, "dihydrxy" should read --dihydroxy--.

Column 1, lines 45 to 55, the formula designated (A) on the left should appear as follows:

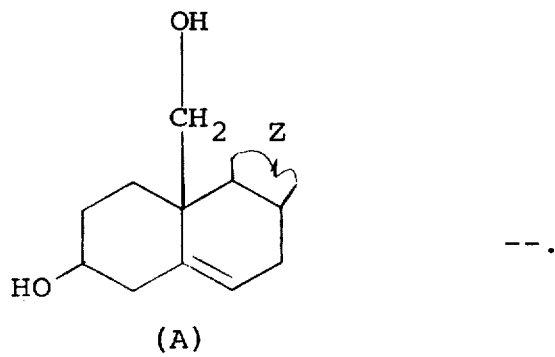

(A)

Column 2, line 43, "17one" should read --17-one--.

Column 3, line 54, "- $^5$ -" should read -- -$\Delta^5$- --.

Column 3, line 69, "17,20;20,21" should read --17α,20;20,21--.

Column 4, line 19, "siad" should read --said--.

SIGNED AND
SEALED
JUN 9 1970

(SEAL)
Attest:

Edward M. Fletcher, Jr.
Attesting Officer

WILLIAM E. SCHUYLER, JR.
Commissioner of Patents